May 21, 1968

S. A. DASHEW ET AL

3,384,031

RAILWAY TRANSPORTATION SYSTEM

Filed Feb. 15, 1965

STANLEY A. DASHEW
HERBERT LA MERS
INVENTORS.

BY Samuel Lindenberg

ATTORNEY

May 21, 1968 S. A. DASHEW ET AL 3,384,031
RAILWAY TRANSPORTATION SYSTEM
Filed Feb. 15, 1965 7 Sheets-Sheet 2

STANLEY A. DASHEW
HERBERT LA MERS
INVENTORS

BY Samuel Lindenberg

ATTORNEY

STANLEY A. DASHEW
HERBERT LA MERS
INVENTORS

BY Samuel Lindenberg

ATTORNEY

May 21, 1968 S. A. DASHEW ET AL 3,384,031
RAILWAY TRANSPORTATION SYSTEM
Filed Feb. 15, 1965 7 Sheets-Sheet 7

STANLEY A. DASHEW
HERBERT LA MERS
INVENTORS.

BY Samuel Lindenberg

ATTORNEY

United States Patent Office 3,384,031
Patented May 21, 1968

3,384,031
RAILWAY TRANSPORTATION SYSTEM
Stanley A. Dashew, Beverly Hills, and Herbert La Mers, Van Nuys, Calif., assignors, by direct and mesne assignments, to The Dashaveyor Company, Venice, Calif., a corporation of California
Continuation-in-part of application Ser. No. 346,818, Feb. 24, 1964. This application Feb. 15, 1965, Ser. No. 436,409
21 Claims. (Cl. 104—138)

ABSTRACT OF THE DISCLOSURE

A transportation system is provided wherein cars have wheel clusters which engage a rail on either side thereof to provide positive traction, prevent sidesway and enable the cars to ascend vertically and to be turned over for unloading. The cars have doors which can be opened and closed as the cars continue moving. The rails are supported within a tube, or spaced rings or L-shaped supports so that the rails may be laid over or under practically any type of terrain.

---

This application is a continuation-in-part of application Ser. No. 346,818, filed Feb. 24, 1964, now abandoned, for a Bulk Transportation System.

The invention relates to an improved material conveyance system particularly adapted to the rapid transport of a variety of materials under a wide variety of conditions.

With expanding industrial and commercial activity, the problems of material transport have become more complicated and expensive. Generally, what have heretofore been thought of as inaccessible areas are now being intensively investigated for the existence of mineral deposits and the like. Upon discovery, the transport of such materials from their locale to conventional shipping points frequently presents extreme difficulty. Further, the movement of material from ship to shore and vice versa, also presents extreme difficulty in those locales where conventional docking facilities are not in existence. Even with conventional docking facilities, ship loading and unloading is expensive and time consuming. In rugged or mountainous terrain, material movement is normally difficult and expensive, frequently to the point of prohibition.

The above brief remarks will be reconized by those skilled in the art, as presenting problem areas which represent some of the most costly facets of industrial and commercial existence. For example, considering the movement of material over extremely long distances, such as is involved in ocean travel, it is not infrequently found that the total cost of loading, unloading, and situs delivery over relatively short distances far exceeds the total cost of the long distant transport. Additionally, a major factor in slowing down the development of relatively rugged or mountainous terrain, even though physically close to populated areas, is the difficulty and expense associated with the movement of the required materials from convenient transport means to the development situs.

While the technical and engineering problems associated with such material transport are many and varied, certain difficulties that have heretofore escaped solution may be isolated when consideration has been given to the various means that have been advanced in the art to improve transport efficiency. For example, it has been suggested that generally tubular means serve as a housing for conveying of material transporting vehicles. The advantages of tubular conveyance have long been apparent. Though this is the technical fact and many constructions have been suggested, there has not been a single successful commercial embodiment. Certain vacuum or pressured air arrangements have been designed and used to facilitate the movement of very small articles. A typical example is the pneumatic tube device used in business establishments to move accounting material from department to department in a confined business location. Such useful embodiments, patently, have never been found economically feasible however, when the problem of the local transport of materials such as iron ore, copper ore, phosphates, bauxite, or the like, has been presented.

What then are some of the specific problems that have prevented the adaptation of tubular-type transport to the movement of bulk materials? Those skilled in the art will immediately recognize the problem of the weight of the material involved. Weight requires power. Weight requires support over the distance traversed. Homogeneous material, and thus bulk, requires appropriate confinement in the transporting vehicle. After meeting these functional requirements, the problem of efficient loading and unloading of the vehicle is presented. These undoubtedly present some of the reasons which have delayed the commercial adaptation of tubular transport in the relatively bulky material field.

With the above in mind, it is a general object of the invention to provide a conveyor system easily adaptable to the efficient transport of bulk material under a wide variety of terrain conditions.

It is a further general object of the invention to provide a material conveying arrangement designed to utilize an enclosed tracking and supporting system.

It is another object of the invention to offer a generally enclosed vehicle supporting system incorporating a novel tracking arrangement arranged to accommodate vehicle support, motion and vehicle drive. A particular feature of the herein disclosed tracking arrangement relates to the mode of connection thereof to the enclosing tube.

A further object of the invention is to provide a novel mode of vehicle support from the mentioned rail to accommodate rotational movement thereof.

Yet another object of the invention is to provide a unique drive arrangement carried by the transport vehicle for moving the vehicle over its rails.

Still another object of the invention is to provide a unique arrangement for permitting loading and unloading of the transport vehicle while it is in motion.

In one embodiment of the drive arrangement an endless belt-type structure having a plurality of drive teeth thereon extends from the transport vehicle. A power source drives the endless belt structure to provide continuous rotation thereof. The unique rail structure has formed therein aligned slots for complemental gear and rack engagement with the drive teeth formed on the belt. In this manner, motion of the belt structure serves to drive the transport vehicle.

In another embodiment of the drive arrangement, the rail structure includes a plurality of spaced parallel rollers. The transport vehicle has extending therefrom a rotatably driven gear which meshes with the spaced rollers and thereby drives the transport vehicle.

A feature of the disclosed invention relates to the provision of a novel mode of automatically opening and closing of the transport vehicle to provide access to the interior thereof. The result is a highly efficient loading and unloading of the transported material. Specifically, one embodiment of the disclosed invention contemplates the construction of a major segment of the transport vehicle of a flexible material. Access means are formed longitudinally of each vehicle and consist of separable flaps having cam means fixed thereto. A unique cam track arrangement may be provided along the vehicle run and arranged for cooperative association with the cam means. By appropriate cam track formation, the separable access flaps may be induced to open and close by the vehicle motion through a determined loading or unloading area. If desired, the access flaps may be opened and closed without halting the transport vehicle thereby substantially improving the efficiency of the loading and unloading operations. In another embodiment, the transport vehicle is made of rigid material. The access means comprises a hinged door extending longitudinally of the vehicle which is also opened and closed by a cam track.

The novel features that are considered characteristic of this invention are set forth with particularity in the appended claims. The invention itself both as to its organization and method of operation, as well as additional objects and advantages thereof, will best be understood from the following description, when read in connection with the accompanying drawings, in which:

Figure 1:
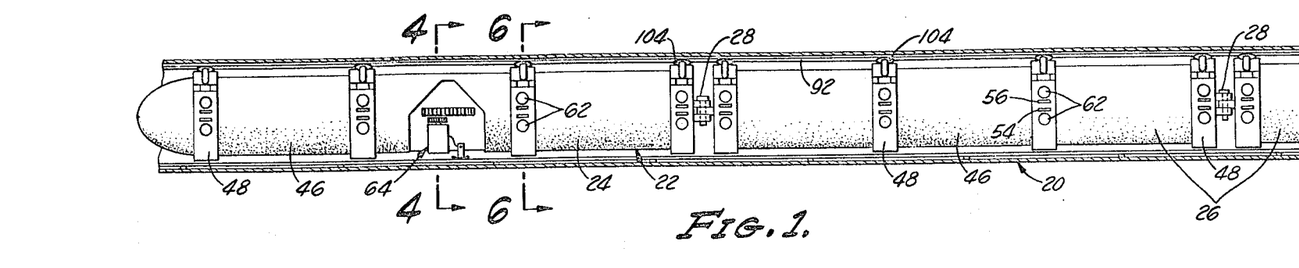
FIGURE 1 is a partially vertically sectioned, side elevational view of a typical segment of the conveyor system.

Referring now to FIGURE 1, the numeral 20 generally designates a hollow tubular structure which serves as a rail carrier, guide and protector for the transport vehicle arrangement indicated generally at 22. It will be noted that in the illustrated embodiment, the vehicle arrangement comprises a tractor 24 and towed trailers 26, 26. Any combination of tractors and trailers desired may be used. Conventional coupling means 28 may interconnect the units. It will be understood that the tubular structure 20 may be of any conventional variety of light pipe construction concurrently commercially available and may be annularly smooth or corrugated as desired.

Figure 3:
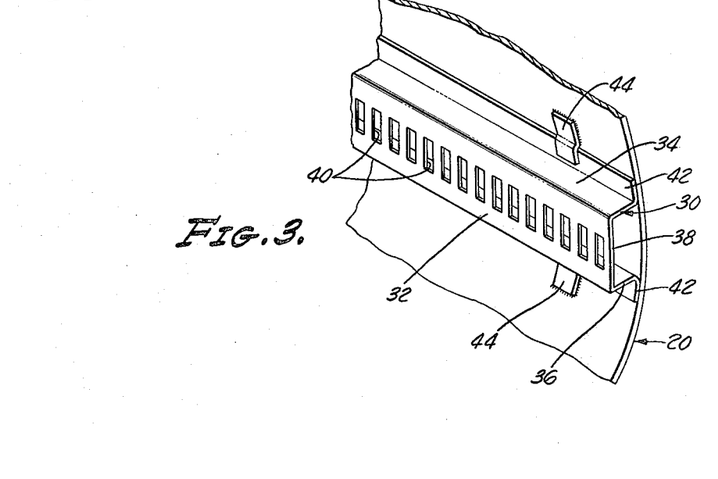
FIGURE 3 is a fragmentary detail view of a segment of the rail and supporting tube utilized in the preferred embodiment of the invention.
Figure 6:
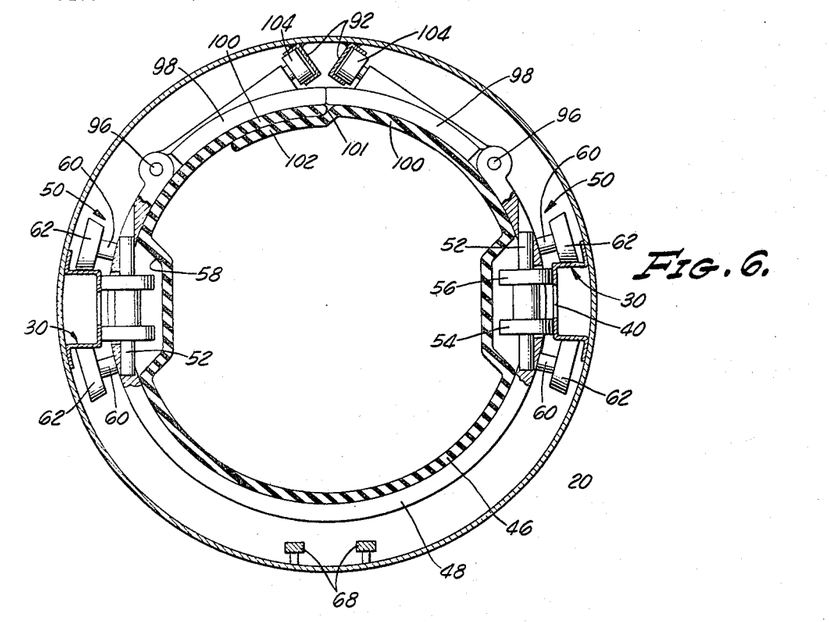
FIGURE 6 is a sectional view, partially in elevation and taken along line 6—6 of FIGURE 1.

Considering FIGURES 3 and 6, it will be seen that the tubular structure 20 has internally affixed thereto rail means, indicated generally at 30. Note particularly, the rail means 30 is preferably horizontally arranged on opposite sides of the structrue 20.

The preferred embodiment of the invention contemplates that each rail means 30 comprises a channel 32 having opposed surfaces 34 and 36 which support a joining wall 38. The joining wall has formed therein a plurality of uniformly spaced and vertically aligned drive slots 40, 40. Oppositely directed mounting flanges 42, 42 are preformed to the contour of the tubular structure 20 and engage the inner surface thereof. Channel mounting clamp members 44, 44 are connected at appropriately spaced intervals to the inner surface of the tubular structure in any conventional manner, such as by welding.

It will be seen that the clamp members 44 overlie the related flanges 42 and thereby secure the channels 34 to the inner surface of the tubular structure 20. It will be noted that the clamp members 44 are not fixedly connected to the flanges 42, thus accommodating longitudinal movement of the channel 32 relative to the inner surface of the tubular structure 20. It is presently contemplated that the tubular structure 20 and rail means 30 be prefabricated in appropriate segments for being easily transportable. They can then be removed to the location where they are going to be used. At the use situs, it may be necessary to bend a given tubular segment into a desired arc. When this occurs, it is a simple matter to add portions of rail where required, by sliding them under the track clamps or to cut portions of tracks if required and remove them by sliding them out from under the rail clamps. It should be understood that while clamp members are shown for the easy mounting of a rail within the tube, where it is preferred, the rail may be attached to the tube by welding, and thus the description of clamping members should not be considered as excluding these other attachment means.

Considering FIGURES 1 and 6, each transport vehicle, that is, either tractor 24 or trailer 26, comprises a longitudinally cylindrical hollow body 46. Each body 46 may be constructed of a semi-rigid flexible material such as reinforced semi-rigid rubber. Such construction accommodates vehicle deformation and return to original form as the vehicle negotiates curves in the course of traveling. Further, such construction offers sufficient body strength to support the various bulky materials for which transport is contemplated.

At appropriate intervals along each vehicle body 46, a generally annular metallic or rigid ring 48 is fixed thereto as by bonding, for example. FIGURE 6 provides a more detailed view of this construction. Each ring 48 is provided with rolling means, indicated generally at 50, on opposite sides of the body 46. Typically, each rolling means 50 comprises a first shaft 52 journally carrying a first pair of horizontally arranged vertically spaced rollers 54, 54. It will be seen that the body 46 is appropriately deformed, as at 56, to offer a cavity 58 to accommodate this construction. Rollers 54 are so positioned as to accommodate rolling engagement with upper and lower surfaces of the joining wall 38.

Each rolling means 50 further comprises vertically spaced shafts 60, 60. Each shaft 60 is arranged to journally carry on the end thereof a truncated pyramoidal roller 62. The rollers 62 respectively cooperate with the side surfaces 34 and 36 of the rail means 30. It should now be clear how each transport vehicle is appropriately carried by the rolling means within the structure 20 and is easily moved therethrough.

Figure 4:
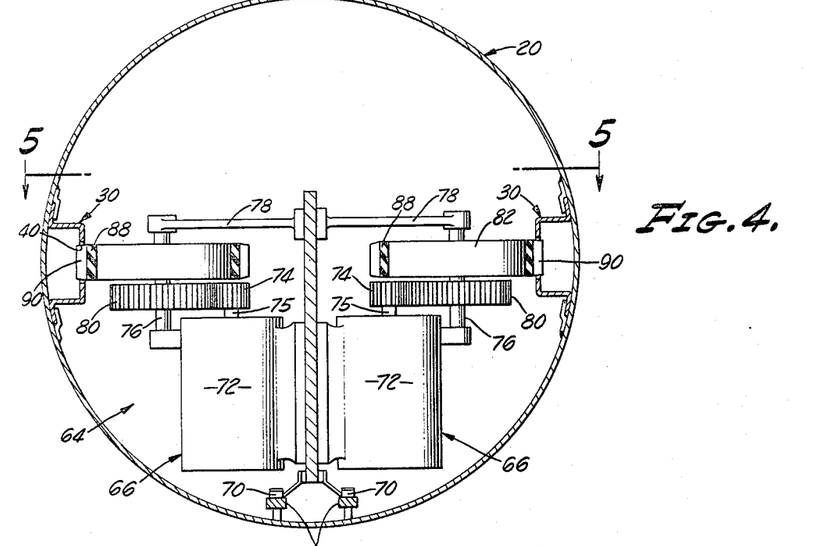
FIGURE 4 is a sectional view, partially in elevation and taken along line 4—4 of FIGURE 1.
Figure 5:
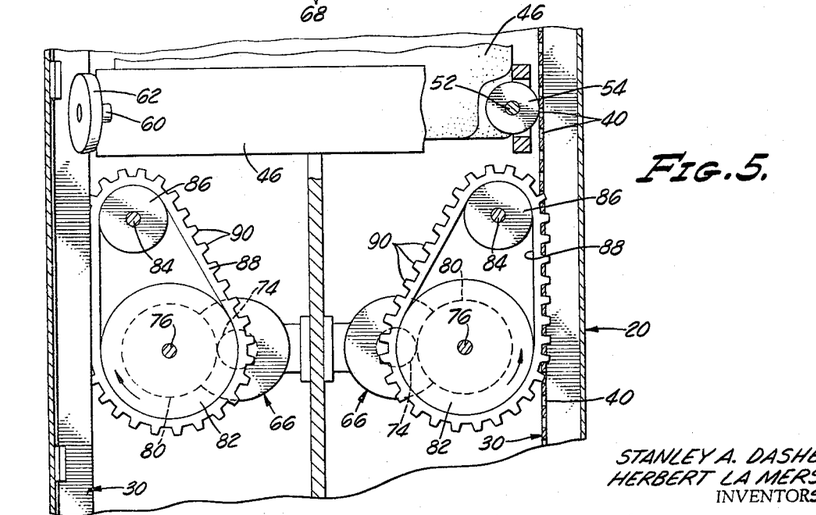
FIGURE 5 is a fragmentary sectional view taken approximately along line 5—5 of FIGURE 4.

Consider now the locomotion means provided, details of which are shown in FIGURES 4 and 5. It will be seen that the tractor 24 carries drive means indicated generally at 64 (FIGURE 1). In the illustrated embodiment, the drive means 64 comprises a pair of electrical motor drive units each indicated generally at 66 (FIGURES 4 and 5). Appropriately insulated conventional electrical bus bars 68 are longitudinally carried within the tubular structure 20 for conventional contact with wipers 70, 70 which supply electrical energy to the drive units 66 in the usual manner and from a source (not shown). While electrical current motor drive units are illustrated in the preferred embodiment because of the relative simplicity thereof and ease of speed control, it will be understood that other conventional power units may be employed.

Specifically, each unit 66 comprises a motor 72 having a drive pinion 74 secured to the armature shaft 75 thereof. A shaft 76 is journally carried by mounting structure 78 and has affixed thereto drive gear 80, the teeth of which engage pinion gear 74. Shaft 76 additionally has affixed thereto drive pulley 82 in vertically spaced relation to gear 80. A second shaft 84 (seen in FIGURE 5) is carried by the structure 78 and an idler pulley 86 is rotatably mounted thereon. An endless belt 88 surrounds the pulleys 82 and 86 for positive mechanical engagement therewith. It will be noted that the belt 88 is provided with vertically arranged, uniformly spaced and outwardly directed drive teeth 90, 90. It will thus be apparent that a plurality of teeth 90 of each belt 88 are in complemental gear and rack engagement with the slots 40 of the track means 30. As electrical energy is supplied to the motors 72, the motors drive each endless belt 88 causing the transport vehicle to move through the tubular structure 20. As noted above, speed control may be had by control of the electrical energy to the motors 72 and vehicle braking may be provided by conventional braking applied (not shown) to shafts or roller wheels or by driving the motors 72 from the endless belts.

The locomotion means may be provided for a single locomotive, or may be placed on each vehicle depending on the amount of drive traction desired or required by the terrain to be traversed.

Figure 2:
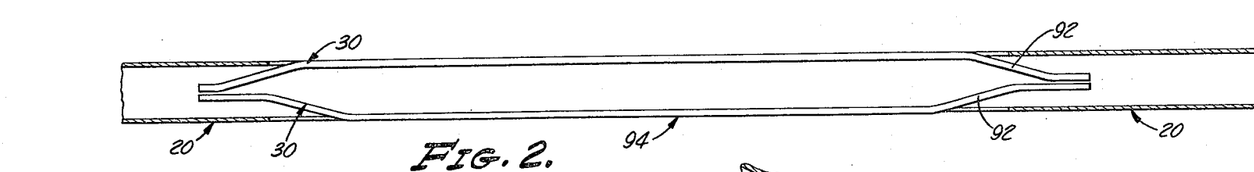
FIGURE 2 is a partially horizontally sectioned fragmentary plan view of a typical loading area that may be employed in the disclosed invention.
Figure 7:
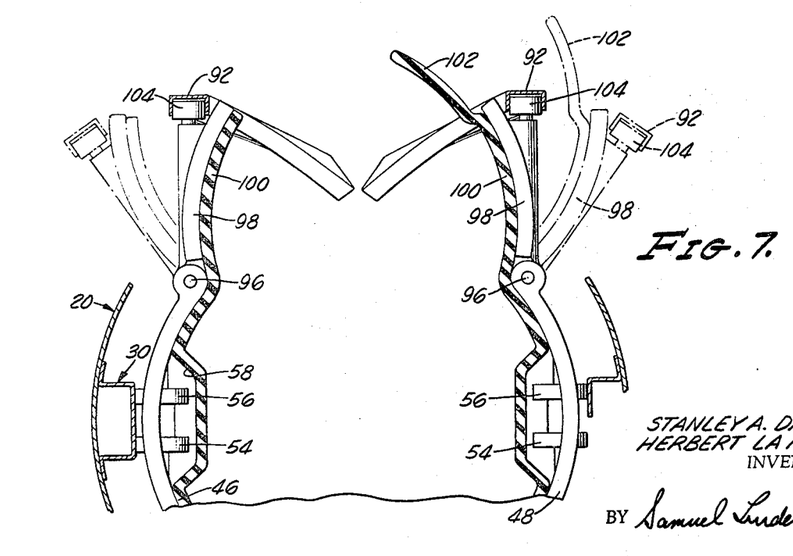
FIGURE 7 is a fragmentary view, similar to FIGURE 6 and illustrating the mode of opening the transport vehicle to provide loading and unloading access to the interior thereof.

For a consideration of the mode of automatically opening and closing each transport vehicle, attention is directed to FIGURES 2, 5 and 7. FIGURE 2 fragmentarily shows the tubular structure 20 having disposed therein cam tracks 92, 92. It will be understood that the tubular structure 20 terminates on the left and right as seen in FIGURE 2 to define therebetween a typical loading or unloading area 94. It will be understood that the rail means 30 continues the run thereof through the area 94 to accommodate vehicle travel therethrough. It will also be understood that for loading or unloading a sufficient portion of the tubing is omitted to afford access to the opened transport vehicle from outside of the tube. Further, if desired unloading may be achieved using gravity by laying the rail means in a manner to cause the transport vehicle to rotate with the doors downward.

Returning to FIGURE 6, it will be seen that each rigid band 48 is provided with opposed pivots 96, 96 at the extremities thereof and adjacent the upper segment of the body 46. Each pivot 96 movably carries a related arm 98 which in turn is bonded to an adjacent flap 100, 100 of the body 46. It will be noted that the flaps 100 are separated as at 101 and one flap may be arranged to underlie the other as at 102 to aid in sealing a vehicle closed. Each arm 98 is further provided with a cam boss 104 which extends above the arm for complemental reception within the related channeled cam track 92.

FIGURE 7 illustrates the operation of opening the vehicle as it approaches and enters area 94. Here it will be noted that the cam tracks 92 both diverge as seen in plan view (FIGURE 2) and are raised in elevation as seen in elevational view (FIGURE 7). As a result of this construction, the cam bosses 104 are urged to follow the cam track form and the respective arms 98 are biased to open position (as here shown in phantom) carrying with them the connected flaps 100. The efficiency of this operation will immediately be apparent to those skilled in this art, and, as noted above, it may be possible in some loading situations to completely load the transport vehicle while the latter is continuously in motion.

It should be noted that for unloading, if desired, rail means 30 may be spiraled to turn over the entire conveyance so that when it reaches an unloading area, the overlapping ends are pulled apart and the contents of the cars are unloaded by gravity. The rolling means 50 here disclosed is particularly amenable in such construction and still offers positive vehicle support during axial rotation thereof. In this manner, the opening area of each vehicle would be directed downwardly for cam boss equipment in a manner identical to that above described with appropriate cam tracks. The gravity unloading of the vehicle can occur without halting vehicle motion.

Figure 8:
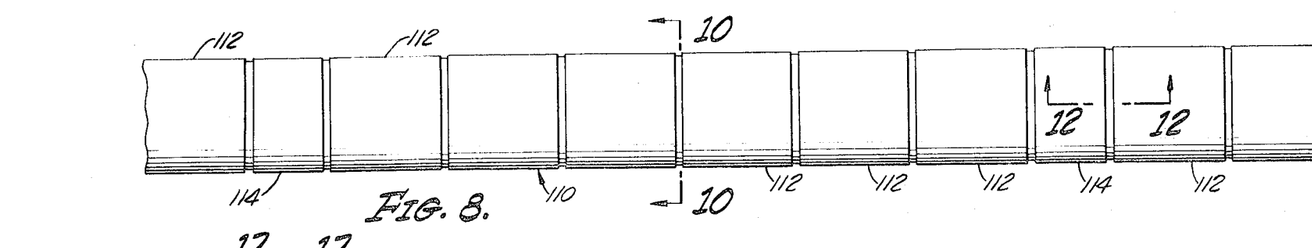
FIGURE 8 is a view showing, in accordance with this invention, another tube construction.
Figures 9, 16, 17:
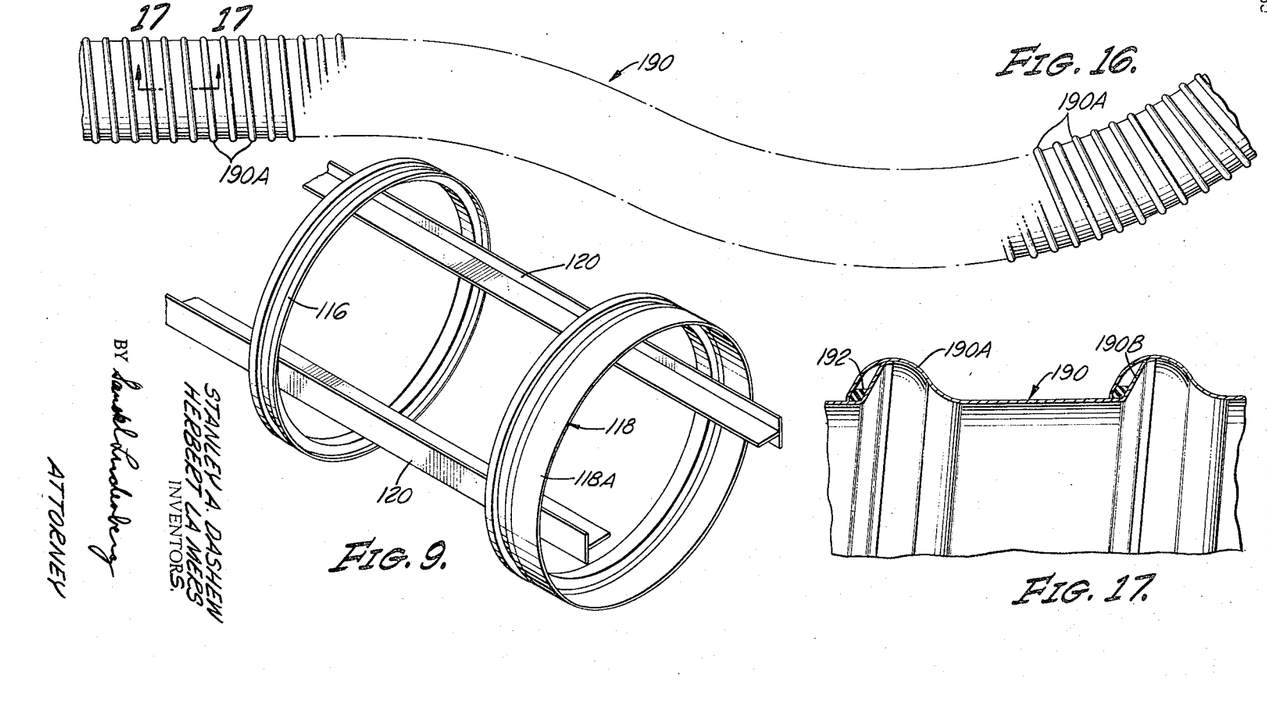
FIGURE 9 is a perspective view illustrating in accordance with this invention, rail and tube.
FIGURE 16 represents the appearance of still another tube construction.
FIGURE 17 is a partial cross-sectional view along the lines 17—17 of FIGURE 16, illustrating the tube construction details.

FIGURE 8 illustrates the external appearance of another tube 110 within which a transit vehicle may travel. The tube has a segmented appearance and by way of example, may comprise sets of six splice sections 112, which are coupled to the adjacent set of six splice sections by a joint section 114. FIGURE 9 shows two ring structures respectively 116, 118. The structure 116 is designated as a track band and the structure 118 may be designated as a joint band. The joint band, upon closer inspection will be seen to comprise a track band having a ring 118A attached to one of the flanged ends of the track band 116 as by butt welding, for example.

The tube 110 has a track band between each splice section. The splice section which is adjacent to a joint section has a joint band at one end thereof adjacent the joint section and a track band at the other end. It will be noted that a rail section 116 has a somewhat U-shaped cross-section with flanges extending outwardly from the ends of the arms of the U.

Also shown in FIGURE 9 is the track support structure 120, of which two are required. The rail support structure, as may be more easily seen in FIGURE 10, has a somewhat T-shaped cross-section and may be very conveniently made by cutting a steel I beam in half. The rail support structures are made in some convenient and easily handled length. However, they should at least extend the distance between the track sections which, in an embodiment of the invention, for example, is on the order of three feet. As will become more apparent hereafter, the rail support structure functions not only to support a roller rail which is used for driving the transport vehicle, but also functions as a rail for the other wheels of a vehicle used to provide rolling support thereof.

Figure 12:
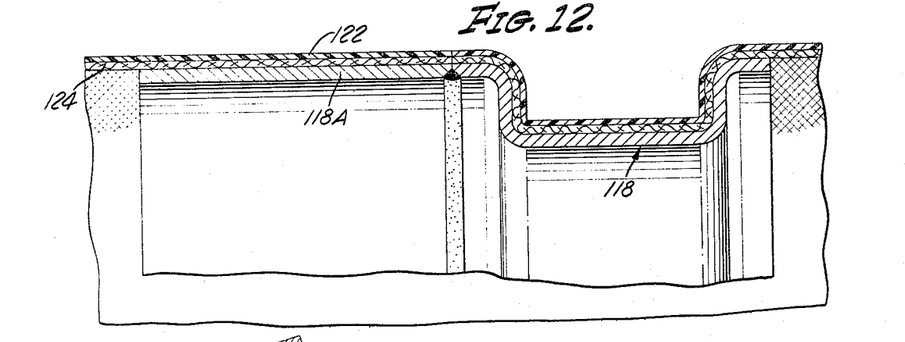
FIGURE 12 is a partial sectional view along the lines 12—12 of FIGURE 8, illustrating the tube construction.

In accordance with this embodiment of the invention, the tube skin is fabricated from some structurally strong, but light material, such as lightweight steel or fiber glass. FIGURE 12 is a partial cross-sectional view illustrating how a fiber glass tube skin 122 may be applied. Prior to applying the tube skin, the rail support structures are attached to two or more of the track bands. The attachment may be made in any convenient manner, such as by welding or by using the clips, such as the clips 44, shown in FIGURE 3. A tubular wrapping 124 of a suitable, inexpensive material, such as cardboard or paper, is then placed around the sections and also is used to cover over the space between track sections. This material may be left in place if desired. If it is wished to remove this material, then its outer surface is sprayed with a suitable parting compound. Thereafter, the fiber glass material is sprayed over the wrapping providing a weatherproof covering as well as a structurally strong tubing material. One of the advantages of using material such as fiber glass is that in the event it is desired to enter the tube at any portion along the length thereof for the purposes of repair or maintenance, it is a simple matter to cut a hole through the fiber glass large enough to enable a person to crawl through. Thereafter, the fiber glass patch may be sprayed to cover the hole. Alternatively, entrance doors may be fabricated at each joint section 114. When the skin is made of a material such as lightweight steel, this may be made in preformed sections which are placed over the band structures and then welded closed and in place.

The problem of rail support alignment is made very simple if the location for the weld or attachment of the rail support structure to the track and joint bands is premarked. It should be noted here that the track bands may also be used for supporting the channel type of track structures, shown in FIGURE 3, if the endless belt type of propulsion is desired.

Figures 10, 11, 11A, 11B:
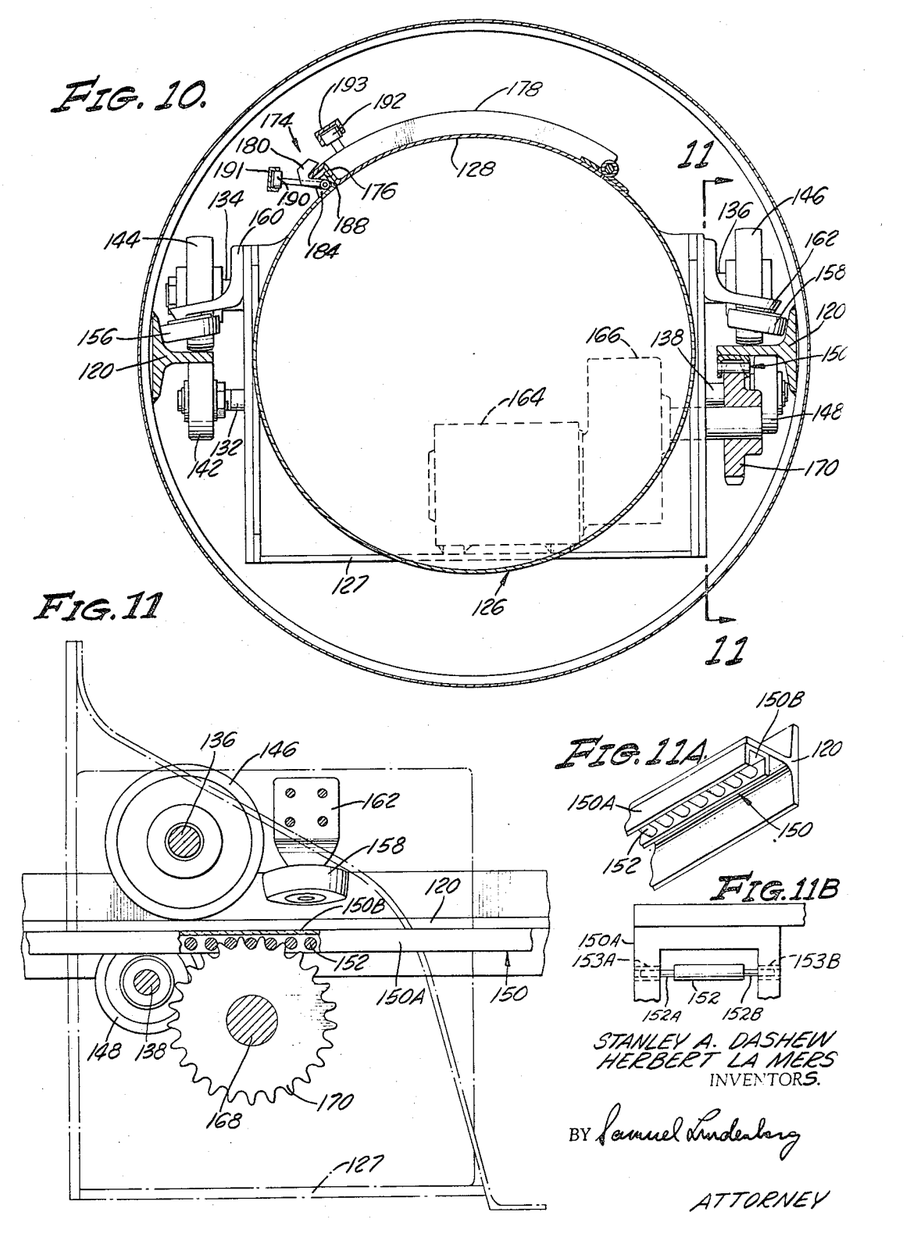
FIGURE 10 is a view along the lines 10—10 of FIGURE 8 showing the manner in which the transport vehicle rides on the rails.
FIGURE 11 is a view along the lines 11—11 of FIGURE 10, illustrating another drive arrangement for the transport vehicle.
FIGURE 11A is a perspective view of the roller rack rail arrangement.
FIGURE 11B is a fragmentary side view of FIGURE 11 showing the rotatable mounting of rollers 152.
Figure 13:
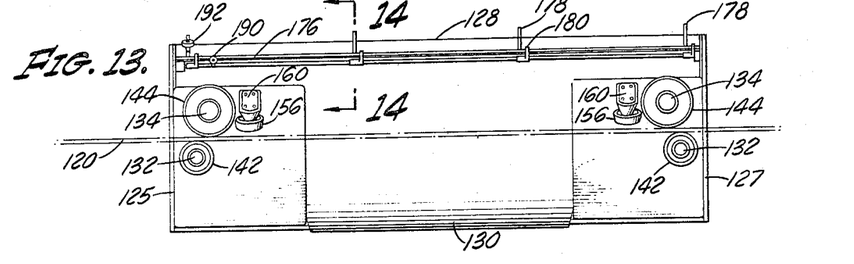
FIGURE 13 is a plan view of a transport vehicle showing the door arrangement.
Figure 14:
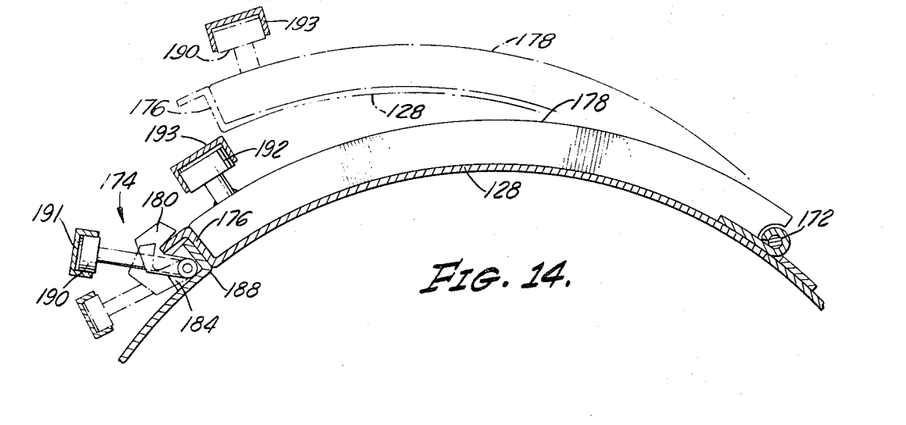
FIGURE 14 is a view along the lines 14—14 of FIGURE 13 showing the details of the vehicle door and door lock.

Referring now to FIGURE 10, which is a cross-sectional view along the lines 10—10 of FIGURE 8, there is shown a cross-section of the tubular body 126 of the transport vehicle in accordance with this embodiment of the invention. At what may be called the "top side" of the transport vehicle, there is placed the door structure 128. Considering FIGURE 13, as well as FIGURE 10, the lower portions of the front and rear ends respectively 125, 127 of the transport vehicle 126 are squared off. Both these portions as well as the remainder 130 of the car are made of a suitable regid material in accordance with the requirements of the weight and kind of material to be carried. The squared off ends provide suitable and well-known rotatable means as well as slidable support for four axles respectively 132 through 138, which extend outwardly therefrom to enable a vehicle to move through the tube and to be rotated therein. These axles respectively rotatably support, on the ends thereof, four idler wheels respectively 142 through 148. The function of these idler wheels is to ride on the upper and lower surfaces of the web portion of a T-shaped rail structure 120 which web portion extends toward the center of the tube from the base portion. It should be noted that the idler wheel 148 rides on the web portion closer to the base portion of the T-shaped rail which is attached to the tube than does the other wheels. This is in order to permit space for the rack roller rail 150. The idler wheels grip the rail structure 120, whereby the transport vehicle may be held and guided by the structure 120 in a manner to be rotated, as required by the load or turned over for unloading.

As may be more clearly seen in FIGURE 11, which is a cross-sectional view along the lines 11—11 of FIGURE 10, and FIGURE 11A which is an isometric view of the rail, the ladder-like roller rack rail structure 150 comprises a substantially U-shaped channel 150A with the base portion 150B attached, as by welding, to the rail support 120. The upper portion of the arms of the U are bridged by parallel spaced, rotatably supported rollers 152 which are substantially similar to the rollers found in a sprocket chain. Both the ladder-like structure of the roller rail and the ladder-like structure of the channel rail have common characteristics in that both effectively have what may be termed a center section with a plurality of perforations which are regularly spaced therealong, and are separated by bridging material. Both also have this center section supported clean of the underlying support structure so that either the gear teeth or endless belt teeth can fit in the spaced holes.

FIGURE 11B is a side fragmentary view of FIGURE 11A showing a roller 152, having an axle 152A, 152B on either side. These extend into bearings 153A, 153B (which are represented by dotted lines), mounted in the side walls of the U-shaped channel.

In addition to the four idler wheels 142 through 148 on which the transport vehicle rides, in order to stabilize against lateral motion, two more idler wheels respectively 156, 158 are rotatably supported by respective bracket supports 160, 162 to press against and roll on the portion of the rail support structure which is adjacent to the tube wall. The bracket supports respectively 160, 162 are attached to the metal band 130.

By way of example, but not by way of a limitation upon the invention, a drive for the transport vehicle is provided on only one side. Such drive may be obtained by a means, such as an electrical motor 164, which drives a shaft 168 through a speed reducing device 166. Power for the electric motor is provided by conventional bus and pickup means, such as described, with the previously-described embodiment of the invention. On the shaft 168 there is attached a drive gear 170. The drive gear meshes with the roller rack rail and when it is rotatably driven, causes the transport vehicle to move. The advantage in using the roller rack rail over the arrangements normally used for achieving linear motion in response to the rotation of a gear is that because of the rotating sections of the individual sprocket-roller structures, the wear on the gear is minimal over what would occur with a rack. Furthermore, the cost of the sprocket-like rail is less than that of an equivalent linear rack, while the wear on the sprocket is far less than would be achieved with a rack. Also, replacement is simple and rapid. In addition, the roller rack rail easily permits the attainment of speeds (30–40 m.p.h.), which are not readily attained by conventional rack and pinion drives, without drastic results. The roller rack rail is placed underneath the T beam in order to prevent the collection of dirt and dust therein.

The number of transport vehicles which have a drive depends upon the nature of the load and the terrain over which the load is being carried. It will be appreciated that with steep terrain and/or heavy load it may be advantageous to have drives in every vehicle whereas, with light loads, and with terrain which is not steep, probably one car equipped with the driving mechanism can pull an entire train. While, by way of illustration, the source of motive power has been indicated as being electrical, it will be appreciated that this may also be conveniently done if desired by other types of motors, such as internal combustion motors.

FIGURES 10, 13, 14 and 15 show the latching structure and the structure for opening and closing the door 128 while the transport vehicle is in motion. With this embodiment of the invention, only one door is provided which extends along one side of the vehicle and is connected at one side thereof by means of a hinge 172. As indicated, the door and the hinge may extend substantially along the length of the car. Spaced along the end of the door opposite to the hinge there are placed several (here shown as four) door lock arrangements 174. An angle bar 176 also extends the length of the door. At one side of the angle bar and attached thereto, at each one of the door lock arrangement positions there is attached a curved bar 178, which is curved to fit the contour of the transport vehicle door and is attached thereto, and which has its other end also connected to the hinge 172. Thus, the curved bar 178 can open or close the door to the transport vehicle whenever the angle bar 176 is moved in an opening or closing direction.

Figure 15:
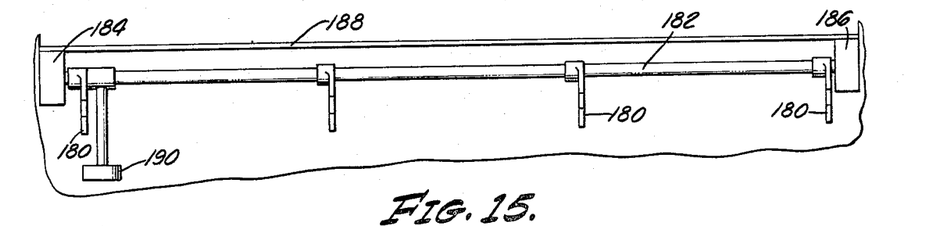
FIGURE 15 is a view in elevation of the latch operating mechanism.

The angle bar 176 is appropriately notched to be engaged by four hook latches 180. Each of the hook latches is attached to a torque bar 182 which is pivotably supported at both ends by pivotal supports 184, 186 which are attached to a bar 188. An actuating wheel 190 is attached by a rod 192 to the torque bar 182. A cam track 191 is provided for the actuating wheel 190. Another cam track 193 is provided for the door opening wheel 192 which is attached to one of the curved bars 178, near the latch end. The cam track 191 for the actuating wheel 190 acts first to disengage the hook latches and rotate them out of the way, when it is desired to open the door 128. Next, the cam track 193 for opening the door engages wheel 192 and guides it to open the door. For closure of the door, first the cam track 193 engages wheel 192 and guides the door shut, then the cam track 191 for wheel 190 guides it to rotate the torque bar and close the latch hooks thereby latching the door. The camming arrangement described is similar to that shown and described for the double flap door arrangement of FIGURE 7 and the track shown in FIGURE 2, except that, of course, a track is required in this embodiment of the invention for operating both the door and the door latch.

Another construction for the tube is represented in FIGURE 16. The tube 190 shown in FIGURE 16 has a corrugated appearance. As shown in the partial cross-section in FIGURE 17 taken along the lines 17—17 of FIGURE 16, the tube may actually be fabricated from a roll of flat metal stock which has one end 190A formed into a semi-circle and the other end 190B formed into one-half of a semi-circle. The flat metal stock is also spirally deformed so that the semi-circular end 190A of one section fits over the half semi-circular end 190B of the adjacent section. As shown in FIGURE 17, a weld 192 is made around the abutting ends whereby the tube is formed.

The tube is quite flexible and is structurally strong. The track bands are placed inside the tube and are welded thereto. The track structure is then attached to the track bands. Alternatively, the tube may have clips 44 inserted therein for supporting the track 30. Alternatively, the track support structure 120 consisting of the T beams may be welded directly to the tubing walls.

Figure 18:
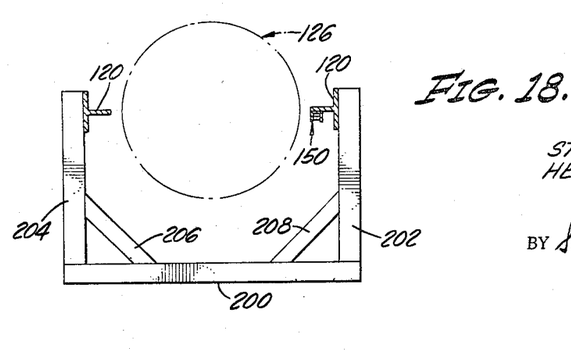
FIGURE 18 is a view of another support arrangement for a track structure.

FIGURE 18 represents an arrangement for supporting the track support structure which may be employed in loading or unloading or other regions where it is not desirable to use half-ring or half-tube structures, but rather a rectangular type of structure. This rail structure holding arrangement simply comprises a base 200 having two upstanding arms, respectively 202, 204 at either end of the base. Support members, respectively 206, 208, extend between the base and the upstanding arms, and hold the upstanding arms erect. The track support structures 120 are welded to the tops of the respective upstanding arms, and the roller track 150 is also welded to one of the structures 120. The arms and base are made of metal which can hold the load of the rolling transport vehicle and load. These structure holding arrangements are spaced apart and are maintained parallel to each other in a similar manner as has been described for the rings or track bands.

Figure 19:
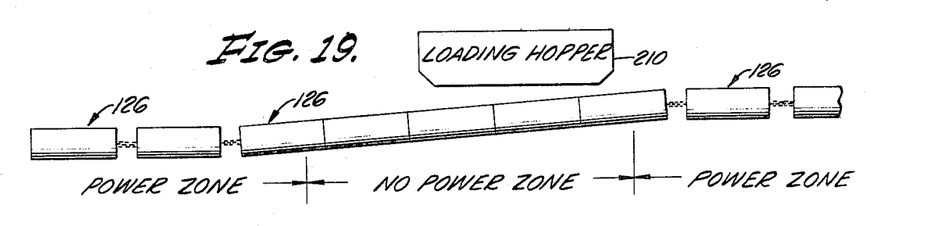
FIGURE 19 is a schematic illustration of a car operating arrangement.

FIGURE 19 is a schematic representation of an arrangement for loading the cars. The problem that arises when it is wished to load the vehicles while they are in motion is that the material which comes out of the loading hopper 210 will not only fall into the vehicle, but also between the vehicle unless special precautions to prevent this are taken. This is not only wasteful of material but can cause a sufficient pile up to interfere with the travel of the cars. To overcome this problem, provision is made so that underneath the loading hopper 210 the ends of the cars abut one another to eliminate spacing therebetween; while away from the hopper the vehicles are spaced apart enough to permit articulation for bends and curves. This is done by using a flexible coupling means, which will be described in connection with FIGURE 20.

The method of insuring that the ends of the vehicles abut one another under the loading hopper is to have an incline preceding the loading hopper and to provide a "no power zone" preceding and under the loading hopper. As a result, the vehicles which are spaced apart, within the "no power zone," would ordinarily slow down and stop on the incline except that vehicles which are behind those in the "no power zone" and which are in the "power zone" push the "no power zone" vehicles up the remainder of the incline and under and past the hopper into the "power zone" again. Because of the flexible coupling means between vehicles, the vehicles which are pushed underneath and past the loading hopper abut one another and thus no material from the hopper falls between them. Once the vehicles reach the "power zone," they spread apart. Provision for a "no power zone" is made by simply moving the power busses out of reach of the power pickup brush in the vehicles.

Figure 20:
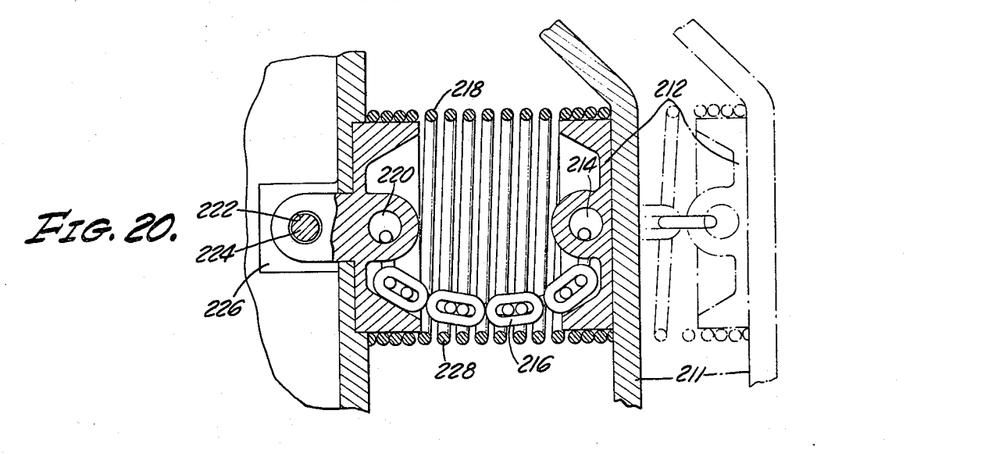
FIGURE 20 is a cross-sectional view of a flexible car coupling mechanism.

FIGURE 20 shows a view in section of a flexible coupling arrangement between the cars. One of the cars has attached to one end a coupling plate 212 with provision for a bolt hold 214 therein. A chain 216 is attached to the coupling plate 212 by its bolt hole 214. A second coupling plate 218 has two spaced and aligned bolt holes therein, respectively 220, 222. The other end of the chain is coupled to the plate 218 by its bolt hole 220. A spring loaded draw pin 224 is inserted through the bolt hole 222 and also through a hole, not seen, in a coupling plate 226 attached to the end of the adjacent vehicle. Thereby the two adjacent vehicles are coupled to each other by a flexible coupling which limits their spacing, but permits them to abut one another.

A helical spring 228 fits over the disattached ends of the coupling plates 212, 218. The spring serves the function of enclosing the chain to prevent tampering therewith, but more important, it serves to assist in pushing the vehicles apart and maintaining their spacing when not in an inclined "no power zone." This prevents undue bumping together of the cars.

From the foregoing description, it may be seen that the invention provides a portable rail laying facility. That is, the rail holding means may be layed wherever it is desired to run the vehicle without worrying about laying rail ties, bridges, etc. The pipe follows the contour of the ground, and the vehicle can operate regardless of the grade because of the rack and pinion or gear and sprocket-type of relationship of the track and vehicle drive mechanism. This invention also lends itself to operation on the surface of water, if desired, by floating the rail carrying pipe, or under water by sinking the pipe to the bottom and keeping it water tight. The vehicle can thus be brought out from land under water, to a mooring buoy and run up from the buoy to a ship moored at the buoy. Thereby ship loading or unloading of bulk materials is provided at locations where there are no suitable docking facilities.

It has been found statistically that forty percent of costs of mining is expended in hauling ore from the location in which it is dug, to the point on the minesite where it is processed. This cost is in operating mines. Where present systems do not permit the costs to come within the forty percent limit, the mines are usually considered uneconomical. The costs are incurred in the three or more different types of transports involved, as well as the transfers in between; i.e., from site to hoist and from hoist to processing site. The present invention eliminates the need for the different transports providing a single conveying vehicle which can be loaded on the mining spot, can carry the material to and up the shaft and thereafter to the processing site economically and quickly.

What is claimed is:
1. A track arrangement for a vehicle comprising:
   rail means;
   means for supporting said rail means, said rail means having a web portion with two surfaces respectively adapted for engagement by a first and a second vehicle wheel;
   rack rail means attached to one of said two surfaces and being adapted for engagement by a gear wheel, said rail means having a third surface other than on said web portion adapted for engagement by a third vehicle wheel.

2. A track arrangement as recited in claim 1 wherein said means for supporting said rail means includes elongated tubular means.

3. A track arrangement as recited in claim 1 wherein said means for supporting said rail means includes spaced rings and means for supporting said spaced rings upright.

4. A track arrangement as recited in claim 1 wherein said means for supporting said rail means includes spaced substantially U-shaped means, and means for holding said spaced substantially U-shaped means upright.

5. A track arrangement for a vehicle comprising a plurality of spaced rail support rings, at least two elongated rail support beams extending between said rail support rings, each said support beam having a T-shaped cross-section, means attaching the top of the T of said support beams to the inside of each rail support ring and with the remainder extending radially inward of said ring, roller rack rail means for each rail support beam and being coextensive therewith, and means for attaching each of said roller rack rail means to one side of the radially inwardly extending remainder of each said rail support beams.

6. In combination a plurality of vehicles each having a door at the top thereof, stationary means for opening a closed door of each vehicle to afford loading access to the interior of said vehicle, and a flexible coupling means coupling said vehicles for enabling the bodies of said vehicles to be abutted at their ends for loading or spaced apart for articulation, each said flexible coupling means consisting of a helical spring and a chain extending within said helical spring, and means connecting the ends of said helical spring and said chain to adjacent ones of said vehicles.

7. In a material conveyor vehicle, a hollow generally flexible body, relatively rigid supporting elements peripherally disposed around said body at spaced intervals thereon and secured thereto, rolling means attached to said rigid supporting elements to support said vehicle, said body including integral door means on at least one side thereof, said door means being movable to open and close position to respectively provide access to the interior of the vehicle and to seal said interior, said door including a portion of said flexible body and being hingably supported on rigid supporting elements external cam follower means, means for fixedly supporting said external cam follower means, and cam means carried by and secured to the door means for cooperative association with said external cam follower means to accommodate opening and closing of the door means while the vehicle is in motion.

8. In an arrangement for automatically opening a material conveyor vehicle while said vehicle is in motion; said vehicle comprising a hollow generally flexible elongated tubular body; rigid supporting elements peripherally disposed around the body at spaced intervals thereon and secured thereto; rolling means to support the vehicle and accommodate motion thereof; said body including a pair of integral flaps movable to open position to provide access to the interior of the vehicle; cam followers carried by the respective flaps, and fixedly supported external cam tracks arranged to receive the respective followers; said cam followers being pivotally connected to the supporting elements; said tracks being formed to diverge as seen in plan view and varying in height as seen in elevational view; whereby upon engagement of said cam tracks by said cam followers, the respective flaps are biased to open position in response to motion of the vehicle relative to the cam tracks.

9. A railway vehicle drive arrangement for a rail-supported vehicle comprising an endless belt carried by the vehicle for continuous motion thereof, power means for driving said belt, an elongated rail having a central rack portion supported by side portions extending therefrom, said vehicle having idler wheels engaging said side portions, said belt having teeth means for engaging said rack portion, said vehicle having means positioning said endless belt with its teeth means in engagement with said central rack portion.

10. A propulsion arrangement for a vehicle comprising an elongated rail means having teeth means said rail means having a generally U-shaped cross-section with oppositely directed flanges at the ends of the arms of the U with said teeth means being disposed along the base of said U-shaped cross-section, and rotatable propulsion means comprising an endless belt having teeth extending outwardly on the surface thereof for successive insertion into said regularly spaced perforations for propelling said vehicle along said rail means.

11. A propulsion arrangement for a vehicle comprising:
rail means having a substantially U-shaped cross-section;
a plurality of regularly spaced rotatably supported sprocket engaging roller means, and
rotatable propulsion means carried by said vehicle including a first means having sprocket teeth for successive insertion into said engaging the teeth means and engaging said roller means for propelling said sprocket engaging vehicle, said rotatable propulsion means including a second and third wheel means for rollably engaging the opposite sides of said rail means adjacent the base of said U.

12. A track and vehicle wheel arrangement for a vehicle comprising.
an elongated beam having a base portion and a web portion extending outwardly therefrom;
means for supporting said elongated beam by its base portion;
wheel means for said vehicle, said wheel means including:
a first and a second wheel rotatably engaging opposite sides of said web portion; and
a third wheel rotatably engaging said base portion.

13. In combination a vehicle and rail arrangement therefor, said rail arrangement including a pair of elongated beams each having a T-shaped cross-section, means for supporting said beams at the top of said T spaced from and parallel to one another with the remaining portions of said T extending toward one another, a rack rail means including sprockets rollers extending along one of said beams, and means attaching said rack rail means to one side of said remaining portion of said one of said beams; a plurality of wheel means carried by said vehicle rollably engaging said pair of elongated beams for rollably carrying said vehicle, a rotatable gear means carried by said vehicle for engaging said sprockets rollers of said rack rail means, and means within said vehicle for rotatably driving said gear means for propelling said vehicle along said rack rail means.

14. In combination a vehicle rail arrangement as recited in claim 13 wherein said beam support means includes walls forming a hollow tube, said vehicle being sized to pass through said tube.

15. In combination a vehicle and rail arrangement therefor as recited in claim 14 wherein each of said plurality of wheel means carried by said vehicle includes three wheels, means positioning a first and second of said three wheels for rollably engaging opposite sides of the portions of said T-shaped beam extending inward toward each other, and means positioning the third of said three wheels for rollably engaging a side of the top section of the T of said beam which is opposite to the side which is fastened to said means for supporting said beams.

16. In combination a vehicle and track arrangement as recited in claim 13 wherein said rack rail means comprises a U-shaped channel, and a plurality of parallel spaced roller sprockets rollably supported across the arms of said U.

17. In combination a vehicle and rail arrangement as recited in claim 13 wherein said means for supporting said beams comprises a tube, and means for attaching said beams to said tube.

18. In combination a vehicle and track arrangement as recited in claim 13 wherein said means for supporting said beams comprises a plurality of spaced parallel rings, said beams being attached to the insides of said rings.

19. In combination a vehicle and rail arrangement therefore, said rail arrangement including a pair of elongated rails each having a base portion and a web portion extending outwardly therefrom, means for supporting said rails by their base portions to be spaced from and parallel to one another with their web portions extending toward one another, a rack rail means extending along the web portion of one of said rails, and means attaching said rack rail means to one side of said remaining portion of said one of said beams; a plurality of wheel means carried by said vehicle rollably engaging said pair of elongated rails for rollably carrying said vehicle, a rotatable gear means carried by said vehicle for engaging said rack rail means, means within said vehicle for rotatably driving said gear means for propelling said vehicle along said rail means, a door extending along and forming one side of said vehicle, hinge means hingably attaching one side of said door to said vehicle, a roller cam, means attaching said roller cam to the side of said door opposite to said one side, first cam follower means engaging said roller cam for pulling said door open as said vehicle is propelled along said rail means, means supporting said first cam follower means from said means supporting said rails, second cam track means engaging said roller cam for closing said door as said vehicle is propelled along said rail means, and means supporting said second cam follower means from said means supporting said rails.

20. In a conveyor system, a generally elongated hollow supporting member, rail means longitudinally carried within the member, said rail means comprising a pair of channel-formed rails carried on opposite sides of and internally of said generally elongated hollow supporting member said channel formed rails having oppositely directed surfaces and a third surface at least one material conveyor vehicle disposed within the member, rolling means carried by the vehicle and cooperatively engaging said rail means to accommodate movement of the vehicle through the member, said rolling means each comprising a first pair of rollers generally carried by the vehicle and rollably engaging generally said oppositely directed surfaces on said rail means, said rolling means each further including at least one other roller rollably engaging said third surface on said rail means said vehicle having door means thereon movable to open position to provide access to the interior of the vehicle, the configuration of said elongated hollow supporting member being altered to enable opening of said door means, cam follower means carried by the door means, external cam surface means, and means for fixedly supporting said cam surface means on the hollow supporting member for operative association with the door-carried cam follower means whereby the door means is biased to open position upon relative motion between the vehicle and the external cam surface means.

21. In a conveyor system, a generally elongated tubular supporting member, a pair of rails carried internally of the member and on opposite sides thereof, said rails being secured to the member to accommodate relative longitudinal movement therebetween, rack means formed on the respective rails, at least one material conveyor vehicle disposed within the member, a plurality of rolling means carried by the vehicle and rollably engaging said rails, each rolling means comprising a first pair of rollers operatively associated with oppositely directed surfaces on the related rail, at least one other roller operatively associated with a third surface on the related rail, said third surface being angularly related to the oppositely directed surfaces, drive means to move the vehicle through the member, said drive means comprising a plurality of endless belts in gear and rack engagement with the rack means mounted on the respective rails, motor means to induce continuous motion of the belts, said vehicle comprising a hollow generally flexible body, rigid elements peripherally secured to the body at spaced intervals therealong, a pair of flexible flaps formed in the body along one side thereof, cam means each including a cam follower pivotally connected to the respective rigid elements and secured to the respective flaps, said system including a pair of cam tracks for operative association with related cam followers, means for supporting said pair of cam tracks, a segment of said cam tracks being arranged to diverge as seen in plan view and varying in height as seen in elevational view whereby upon engagement of said cam tracks by said cam followers the cam followers and connected flaps are biased to open position in response to relative movement between the vehicle and the cam rail.

References Cited

UNITED STATES PATENTS

| | | | |
|---|---|---|---|
| 1 | 7/1836 | Ruggles | 105—29 |
| 372,749 | 11/1887 | Hagerty | 104—138 |
| 376,567 | 1/1888 | Weems | 104—138 X |
| 432,204 | 7/1890 | McLaughlin | 104—140 |
| 456,818 | 7/1891 | Herrington | 104—139 |
| 564,861 | 7/1896 | Barnes | 105—29 |
| 751,893 | 2/1904 | Aultman et al. | 105—29 |
| 901,975 | 10/1908 | Lynch | 105—29 |
| 1,027,073 | 5/1912 | Sessions et al. | 105—29 |
| 1,061,035 | 5/1913 | Batcheller | 104—138 X |
| 1,140,412 | 5/1915 | Spelling | 105—146 X |
| 1,266,630 | 5/1918 | Ross et al. | 214—63 |
| 1,465,294 | 8/1923 | Barbarou | 280—484 |
| 1,480,678 | 1/1924 | Feucht | 213—46 |
| 1,594,863 | 8/1926 | Warner | 214—63 |
| 1,692,657 | 11/1928 | Haseltine | 213—221 X |
| 2,199,935 | 5/1940 | Johns | 198—57 |
| 2,602,553 | 7/1952 | Flowers | 213—75 X |
| 2,652,785 | 9/1953 | Cox | 105—29 |
| 2,679,405 | 5/1954 | Snyder | 280—481 |
| 2,839,010 | 6/1958 | Harbulak | 105—1 |
| 2,892,418 | 6/1959 | Cena | 104—140 X |
| 2,986,334 | 5/1961 | Barker | 105—29 X |
| 3,017,842 | 1/1962 | Nampa | 105—376 |
| 3,171,363 | 3/1965 | Eden et al. | 105—29 |
| 3,194,183 | 7/1965 | Schwartz et al. | 214—42 X |
| 3,221,668 | 12/1965 | Munck | 105—29 |
| 3,251,487 | 5/1966 | Giesking | 105—377 X |

FOREIGN PATENTS 613,407 5/1935 Germany.
92,899 11/1958 Norway.

ARTHUR L. LA POINT, *Primary Examiner.*

H. BELTRAN, *Assistant Examiner.*